United States Patent
Park

[11] Patent Number: 6,128,339
[45] Date of Patent: Oct. 3, 2000

[54] APPARATUS AND METHOD FOR MASKING VIDEO DATA ERRORS

[75] Inventor: Dong-seek Park, Daegu, Rep. of Korea

[73] Assignee: Samsung Electronics Co., Ltd., Kyungki-Do, Rep. of Korea

[21] Appl. No.: 08/799,935

[22] Filed: Feb. 13, 1997

[51] Int. Cl.[7] ............................... H04B 1/66; H04N 7/00
[52] U.S. Cl. ..................... 375/240; 348/405; 348/466; 348/845.1
[58] Field of Search ................... 348/845.1, 845, 348/466, 465, 400, 401, 420, 405, 407, 421, 395; 358/463, 447; 375/240; H04N 7/00; H04B 1/66

[56] References Cited

U.S. PATENT DOCUMENTS

| | | | |
|---|---|---|---|
| 4,647,972 | 3/1987 | Strehl | 348/466 |
| 4,724,488 | 2/1988 | Van Daele et al. | |
| 4,982,191 | 1/1991 | Ohta | 341/118 |
| 5,191,446 | 3/1993 | Hamano et al. | 358/463 |
| 5,369,439 | 11/1994 | Matsuda et al. | 348/405 |
| 5,374,958 | 12/1994 | Yanagihara | 348/405 |
| 5,442,400 | 8/1995 | Sun et al. | 348/466 |
| 5,534,928 | 7/1996 | Iwamura | 348/466 |
| 5,559,557 | 9/1996 | Kato et al. | 348/405 |
| 5,570,199 | 10/1996 | Tanaka et al. | 348/405 |
| 5,737,022 | 4/1998 | Yamaguchi et al. | 348/845.1 |

FOREIGN PATENT DOCUMENTS

| | | |
|---|---|---|
| 0123893 | 8/1986 | European Pat. Off. |
| 3538735 C2 | 5/1987 | Germany. |
| 62-072078 | 4/1927 | Japan. |
| 5-103313 | 4/1993 | Japan. |
| 5-91332 | 4/1993 | Japan. |
| 5-244468 | 9/1993 | Japan. |
| 6-83971 | 6/1994 | Japan. |
| 7-312755 | 11/1995 | Japan. |

*Primary Examiner*—Bryan Tung
*Assistant Examiner*—Gims Philippe
*Attorney, Agent, or Firm*—Sughrue, Mion, Zinn, Macpeak & Seas, PLLC

[57] ABSTRACT

An apparatus and method for masking video data errors by detecting direct current errors of a block unit during the decoding of video data. A video frame is composed of a plurality of macro blocks formed of a plurality of blocks, each having a predetermined size and a direct current (DC) value. The apparatus masks errors during the decoding of compressed video data, and includes a first frame storing portion for storing video data of a previous frame, and a second frame storing portion for storing video data of a present frame. An error detector calculates a direct current value difference between the respective blocks in the decoded video data and detects a specific macro block error, when the difference value is greater than a reference threshold. A DC error detector copies the data of the same position stored in the first frame storing portion in the position in which the error of the second frame storing portion is generated, when errors are detected in the error detector. On the other hand, the DC error detector writes the data in the second frame storing portion when no errors are detected. Errors within the video data are masked by determining whether the DC errors are generated. This method is preferred when a channel is passed by performing low rate video coding with respect to a video sequence using the H.263 standard, thus preventing error propagation.

12 Claims, 3 Drawing Sheets

FIG. 1
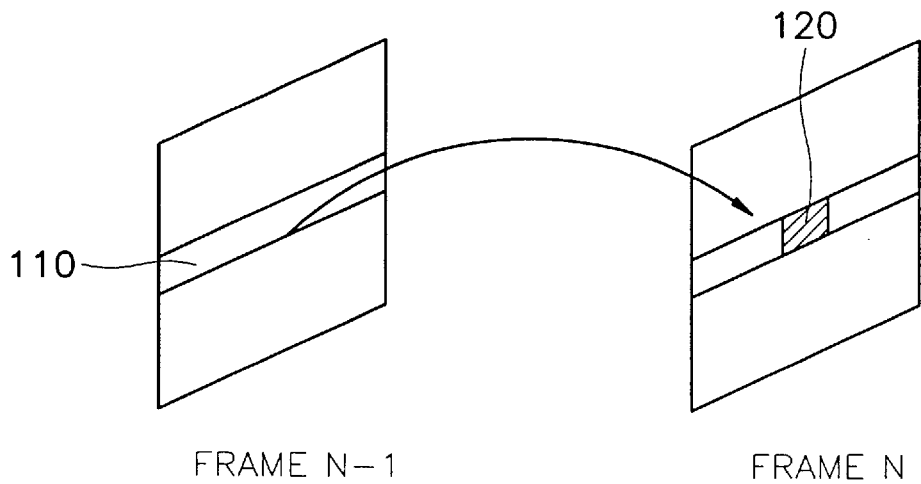
FRAME N-1    FRAME N
FIG. 2
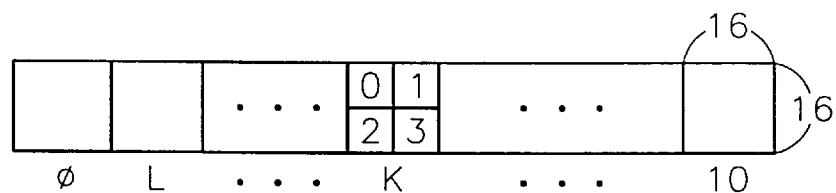
FIG. 3A    FIG. 3B
| 129 | 130 |
|---|---|
| 126 | 132 |
| 2 or 3 | 4 or 5 |
|---|---|
| 254 or 255 | 8 or 9 |

FRAME N

FRAME N+α

APPARATUS AND METHOD FOR MASKING VIDEO DATA ERRORS

BACKGROUND OF THE INVENTION

The present invention relates to an apparatus and method for masking errors in video data. More particularly, the present invention is directed to an apparatus and method for detecting direct current errors of a block unit during the decoding of video data and for masking the detected errors.

In general, a large amount of video data is required to be digitally processed in order to generate digital images and show multidimensional characteristics. Therefore, to process this data and then transmit or store the digital images efficiently, compression of the data is required because of the limited capacity of storage mediums and transmission speeds of communications lines.

Standardization with respect to compression of motion image data has been proposed by the Moving Picture Expert Group (MPEG), pursuant to JTC1/SC-29 under the International Organization for Standardization-International Electrotechnical Commission (ISO-IEC). The ISO-IEC is an international organization for the standardization of formats. The International Telecommunications Union-Telecommunications standardization sector (ITU-T) has conducted research relating to the preparation of a video coding standardization based on an ATM protocol in order to transfer images for the future B-ISDN, and has recently recommended several H.26x standardized proposals. Among the H.26x standardized proposals, the H.263 proposal concerns video coding for low bit rate communications which is suitable for devices such as a wireless videophones, etc.

It is inevitable that video data transmitted through a network (wired or wireless) will have network errors. In a wireless network, the bit-error-rate (BER) for defining the error generation probability is high and a burst error is often generated. In order to reduce such a channel induction error, a channel CODEC such as Bose-Chaudhuri-Hocquenghem (BCH) and RCPC have been developed to be combined with the H.263 proposal. However, since the quantity of data can rapidly be increased in such a channel CODEC (for example, the quantity of data increases 1500% when the rate of RCPC is 1/16), the data rate should be appropriately compromised. For this format, error masking can be simply performed in a video decoder, aside from the channel CODEC.

FIG. 1 shows a manner of masking errors in a video decoder, pursuant to the H.263 standard. Reference numerals 110 and 120 represent a group of blocks (GOB) and a macro block (MB), respectively, in a video frame. When errors are generated during decoding of a video bit stream received from a present frame N, the video decoder stops decoding the present GOB and copies a GOB of a previous frame N-1, which is in the same position as that of the present GOB, to the memory of the present frame N.

However, the following problems occur in the above method. First, the structure of the GOB is shown in FIG. 2. In the QCIF format (176×144) which is a video format for implementing the H.263 standard, there are nine GOBs in a frame and eleven MBs in a GOB. As for luminance, since one MB (16×16) is constructed from four 8×8 blocks, a direct current (DC) value is transferred to each 8×8 block in a fixed-length of eight bits. In an actual H.263 bit stream, there are many parts variable-length encoded and cases in which errors are not detected due to the characteristics of the Huffman decoder. For example, it is assumed that the DC values of the respective 8×8 blocks of the macro block (MB) K shown in FIG. 2 are as shown in FIG. 3A, and that they are corrupted as shown in FIG. 3B. Namely, the values are corrupted from 1000 0001 (129) to 0000 001×(2 or 3), from 1000 0010 (130) to 0000 010 (4 or 5), from 0111 1110 (126) to 1111 111×(254 or 255), and from 1000 0100 (132) to 0000 100×(8 or 9). For example, when the values just prior to performing the decoding are corrupted by one bit due to a shift-left or for any other reason, substantially different DC values (as shown in FIG. 3B) can be generated. This presents a problem.

In addition, in a video decoder, a block of a primary color such as red, green, or blue is generated as shown in FIG. 4A. Errors which result propagate as time passes, depending on the value of a motion vector as shown in FIG. 4B. This severely deteriorates the picture quality since the errors are not detected, even though they are generated as shown in FIG. 3B, and because the DC value has a fixed length.

SUMMARY OF THE INVENTION

It is therefore an object of the present invention to provide an apparatus for improving the picture quality of the H.263 standard by performing error masking through a direct current error detection apparatus and method during the decoding of video data.

It is another object of the present invention to provide a method for improving the picture quality of the H.263 standard by performing error masking through a direct current error detection during decoding of video data.

To achieve the above and other objects of the present invention, there is provided an apparatus for masking video data errors by decoding compressed video data, wherein a frame of video data includes a plurality of macro blocks formed of a plurality of blocks, each having a direct current (DC) value. The apparatus includes first frame storage means for storing video data of a previous frame, second frame storage means for storing video data of a present frame, error detecting means for calculating a direct current value difference between respective blocks in the decoded video data and detecting a specific macro block error when the difference value is greater than a reference threshold, and DC error detecting means for copying the data of the same position stored in the first frame storage means in the position in which the error of the second frame storage means is generated, when errors are detected in the error detecting means, and for writing the data in the second frame storage means when errors are not detected.

In further accordance with the above objects, there is provided a method for masking errors of video data by decoding compressed video data, wherein a frame of video data includes a plurality of macro blocks formed of a plurality of blocks, each having a direct current value. The method includes the steps of calculating the difference in DC values between the respective blocks in the decoded video data, determining whether the difference value output from the DC value difference calculating step is greater than a reference threshold, and copying the data of the previous frame in the position in which the error of the present frame is generated by generating an error signal when the difference value is greater than the reference threshold, and writing the decoded data in the present frame when the difference value between the DC values is less than the reference threshold.

BRIEF DESCRIPTION OF THE DRAWINGS

The above objects and advantages of the present invention will become more apparent through the following detailed description of a preferred embodiment of the present invention, with reference to the attached drawings in which:

FIG. 1 shows a method for masking errors in a video decoder in compliance with the H.263 standard;

FIG. 2 shows the structure of a GOB in the case of QCIF of the H.263 standard;

FIGS. 3A and 3B show the original and corrupted direct current values of a luminance in a macro block K of FIG. 2

DETAILED DESCRIPTION OF A PREFERRED EMBODIMENT OF THE INVENTION

A preferred embodiment of the present invention will be described in detail with reference to the attached drawings.

Figure 4A:
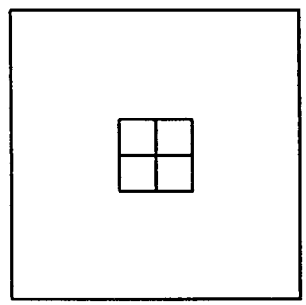
FIGS. 4A and 4B show a case in which errors are generated in the direct current of FIGS. 3A and 3B in a present frame (N) and a phenomenon in which an error propagation is generated as time passes, respectively.
Figure 4B:
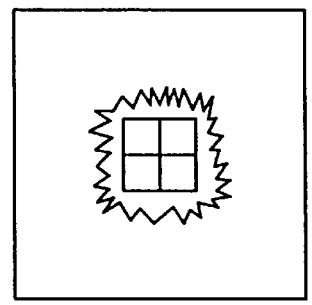
Figure 5:
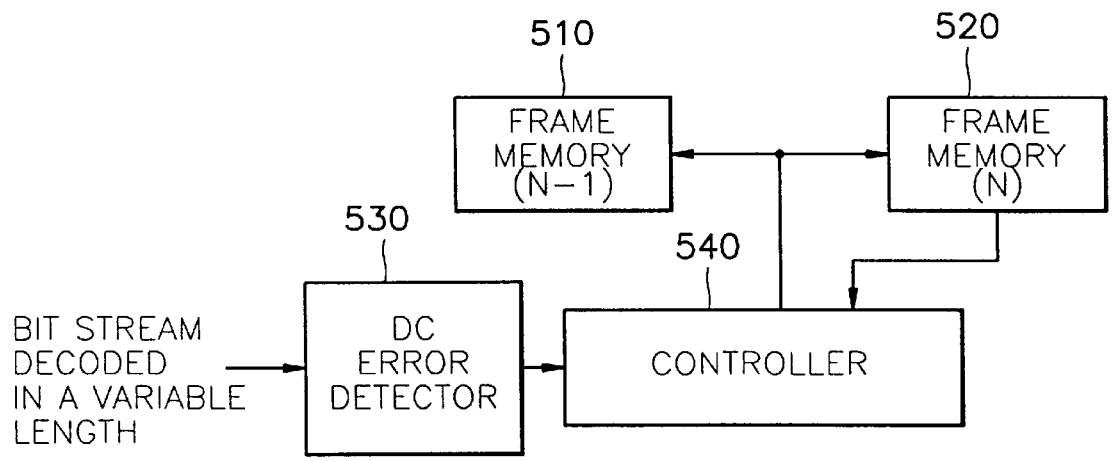
FIG. 5 is a block diagram showing the structure of an error masking apparatus according to the present invention.

FIG. 5 is a block diagram showing the structure of an error masking apparatus according to the present invention. The apparatus includes a first frame memory 510 for storing the video data of a previous frame N-1, a second frame memory 520 for storing the video data of a present frame N, a direct current (DC) error detector 530 for detecting a direct current DC error in a bit stream variable-length decoded, and a controller 540 for copying and writing with respect to the first frame memory 510 and the second frame memory 520 according to the direct current error signal generated in the direct current error detecting portion 530, and for determining the position of the data to be controlled.

Figure 6:
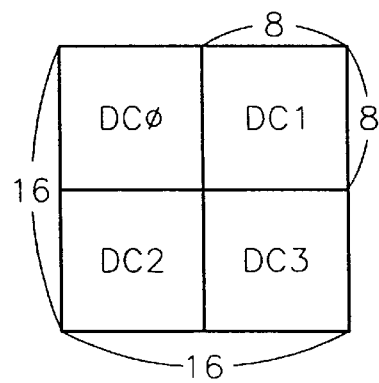
FIG. 6 shows the DC values of an optional macro block MB of a video data standard according to the H.263 standard.

FIG. 6 shows the DC values of an optional macro block MB of video data according to the H.263 standard. A 16×16 macro block is constructed of four 8×8 blocks. The DC values including DC0, DC1, DC2 and DC3 exist in the respective four blocks.

Figure 7:
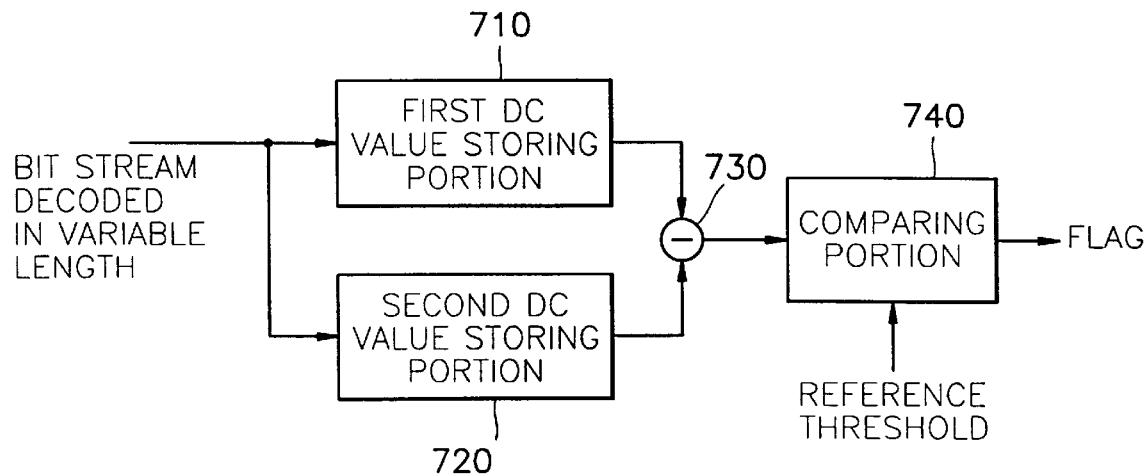
FIG. 7 is a detailed block diagram of the direct current error detecting portion of FIG. 5.

As shown in FIG. 5, the frame memory N-1 510 stores the video data of the previous frame and the frame N memory 520 stores the video data of the present frame. When it is assumed that the DC values DC0, DC1, DC2 and DC3 of an optional macro block exist in the input bit stream, which are decoded in a variable length as shown in FIG. 7, the DC error detector 530 measures the differences between the respective DC values. The DC error detector 530 compares the measured difference values with a reference threshold and detects the DC error signal when the measured differences are larger than a threshold, since it is noted that the DC values of a specific macro block or a 8×8 block have errors. When the error signal is detected from the DC error detector 530, the controller 540 copies specific video data in the position of the present frame memory N 520 in which the errors are generated by designating the specific video data in the same position as that of the previous frame memory N-1 510. The controller 540 writes the decoded data in the present frame memory N 520 when the DC value differences among the respective blocks are smaller than the threshold; that is, when the DC values of the specific macro block or the 8×8 block do not have errors.

FIG. 7 is a detailed block diagram of the DC error detector 530 of FIG. 5. The detector 530 includes first and second DC storing portions 710 and 720, for storing the DC values of the first and second blocks in the macro block of the bit stream decoded in a variable length, a subtracter 730 for outputting the difference of the DC values output from the first and second DC storing portions 710 and 720, and a comparing portion 740 for comparing the value output from the subtracter 730 with a reference threshold and for generating a flag signal.

As shown in FIG. 7, the first and second DC value storing portions 710 and 720 store the DC values DC0, DC1, DC2 and DC3 of an optional macro block in the variable length bit streams. The first DC value storing portion 710 stores the DC value DC0 of FIG. 7, and the second DC value storing portion 720 stores the DC value DC1, the DC value DC2, or the DC value DC3; that is, a value other than the DC value DC0 of FIG. 7. The subtracter 730 calculates the difference between the DC values output from the first and second DC storing portions 710 and 720 and outputs the DC difference value. The comparing portion 740 compares the DC difference value output from the subtracting portion 730 with a predetermined reference threshold and generates a flag signal for determining whether a DC error is detected. For example, when the difference value between the decoded DC value DC1 of FIG. 7 and the DC value DC0 is larger than the predetermined reference threshold due to a change in the DC value DC1, the flag signal becomes "1" which indicates that an error has been generated. When the DC difference value is smaller than the predetermined reference threshold, the flag signal becomes "0" which indicates that an error was not generated. Here, by way of example, a value greater than 40 is used as the predetermined reference threshold by a computer simulation.

Figure 8:
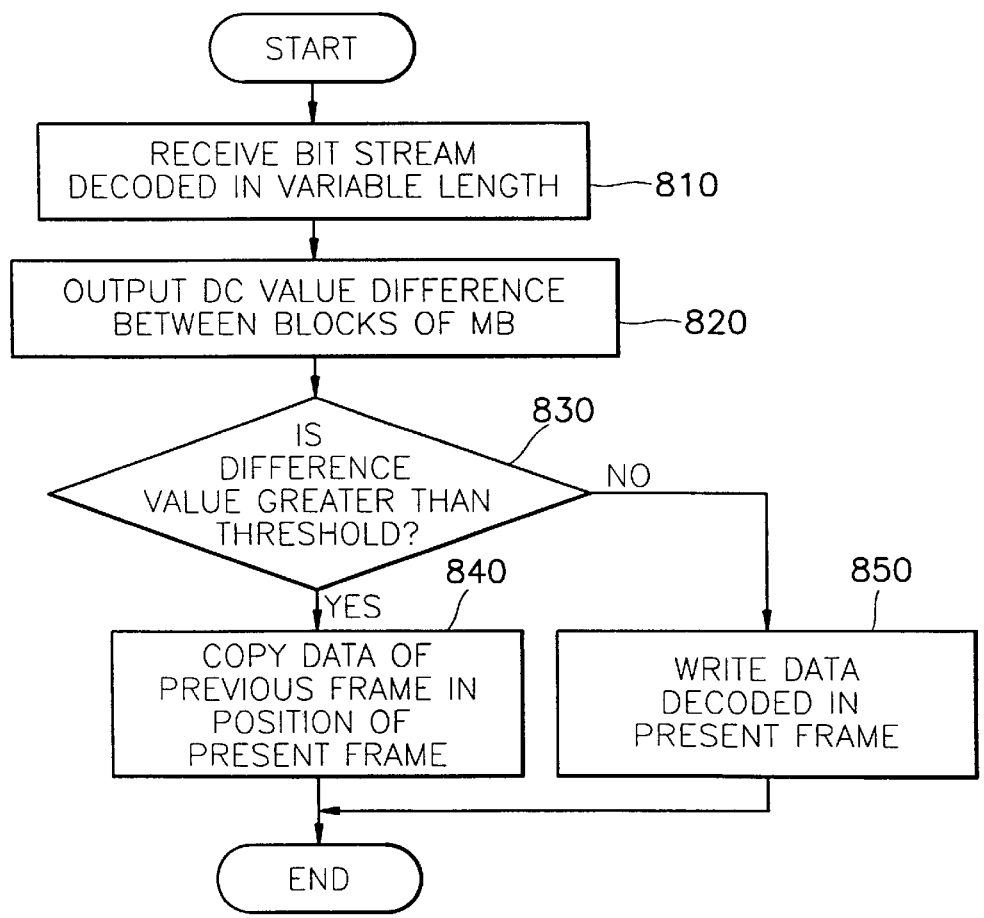
FIG. 8 is a flow chart for describing an error masking method in accordance with the present invention.

FIG. 8 is a flowchart for describing the error masking method according to the present invention. The method includes the steps of: receiving a bit stream that has been variable length decoded (step 810), outputting a difference value between the DC values of a macro block (step 820), determining whether the difference value of the DC values is greater than a reference threshold value (step 830), copying the data of a previous frame in the position of a present frame when the difference value of the DC values is greater than the reference threshold (step 840), and writing the decoded data in the present frame when the difference value of the DC values is less than the reference threshold (step 850).

As shown in FIG. 7, the DC error detector 530 receives the bit stream decoded in a variable length (step 810), calculates the DC value difference between the respective blocks in the macro block in the decoded video data (step 820), and determines whether there is an error in the calculated value by determining whether the calculated value is greater than the reference threshold. The DC error detector 530 allows the controller 540 to copy the data of the previous frame in the position in which the error of the present frame is generated (step 840), when the DC difference value between the respective blocks is greater than the reference threshold, and allows the controller 540 to write the decoded data in the present frame (step 850), when the DC difference value between the respective blocks is less than the reference threshold value.

As described above, according to the present invention, it is possible to mask the errors by determining whether DC errors are generated, which is important information when a channel is passed by performing a low rate video coding with respect to a video sequence using the H.263 standard, thereby preventing error propagation.

There has thus been shown and described a novel apparatus and method for masking video data errors which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. An apparatus for masking video data errors by decoding compressed video data, wherein a data frame includes a plurality of macro blocks formed of a plurality of blocks, each having a direct current (DC) value, said apparatus comprising:

first frame storage means for storing video data of a previous frame;

second frame storage means for storing video data of a present frame;

error detecting means for calculating a direct current value difference between respective blocks in said decoded video data and for detecting a specific macro block error when the difference value is greater than a predetermined reference threshold; and means for copying, when errors are detected in said error detecting means, data of the same position stored in said first frame storage means into the position in which the error of said second frame storage means is generated, and means for writing the data in said second frame storage means when errors are not detected.

2. An apparatus for masking errors of video data as claimed in claim 1, wherein said error detecting means comprises:

first and second DC storing portions for storing DC values of first and second blocks of macro blocks of the decoded video data;

a subtracting portion for calculating the difference between the DC values output from said first and second DC storing portions; and a comparing portion for comparing the value output from said subtracting portion with a predetermined reference threshold and generating an error signal.

3. An apparatus for masking errors of video data as claimed in claim 1, wherein predetermined unit blocks of said error detecting means are of four 8×8 blocks belonging to a 16×16 macro block.

4. The apparatus of claim 3, wherein predetermined unit blocks of said error detecting means comprise four 8×8 blocks belonging to a 16×16 macro block, wherein the 8×8 blocks correspond to first through fourth 8×8 blocks, wherein the direct current value of respective blocks corresponds to a luminance value for the respective block and is represented by an n-bit value, and wherein said error detecting means calculates a difference between the n-bit direct current value of said first 8×8 block and the n-bit value of one of said second through fourth 8×8 blocks to provide a luminance bit difference, and said error detecting means determines macro block error in accordance with whether the luminance bit difference is higher than the predetermined threshold.

5. An apparatus for masking errors of video data as claimed in claim 1, further comprising a controller coupled to said first and second frame storage means and said error detecting means for controlling operation of said apparatus.

6. The apparatus of claim 1, wherein said error detecting means, first and second frame storage means, and means for copying are operable at a reception side of a system for communicating compressed video data.

7. An apparatus for masking video data errors contained within an incoming bit stream of blocks of decoded video data, said apparatus comprising:

a first storage for storing a first frame of video data;

a second storage for storing a second frame of video data;

error detector, responsive to the incoming bit stream of blocks of video data, said error detector comprising means for calculating a direct current value difference between respective blocks in said video data and means for detecting a macro block error when the difference value is greater than a predetermined reference threshold; and a controller, responsive to an output of said error detector, and comprising means for copying, when errors are detected in said error detector, data of the same position stored in said first storage into the position in which the error of said second storage is generated, and means for writing the data in said second storage when errors are not detected.

8. An apparatus for masking errors of video data as claimed in claim 7, wherein said error detector comprises:

first and second DC storages for storing DC values of first and second blocks of macro blocks of the incoming bit stream of video data;

a subtractor for calculating the difference between the DC values output from said first and second DC storages; and a comparator, coupled to an output of said subtractor, for comparing the value output from said subtractor with a predetermined reference threshold and generating an error signal.

9. The apparatus of claim 7, wherein predetermined unit blocks of said error detector comprise first through fourth 8×8 blocks belonging to a 16×16 macro block, wherein the direct current value of respective blocks corresponds to a luminance value for the respective block and is represented by an n-bit value, and wherein said error detector calculates a difference between the n-bit direct current value of said first 8×8 block and the n-bit value of one of said second through fourth 8×8 blocks to provide a luminance bit difference, and the error detector determines macro block error in accordance with whether the luminance bit difference is higher than the predetermined threshold.

10. The apparatus of claim 7, wherein said first and second storage, said error detector and controller are operable at a reception side of a system for communicating compressed video data.

11. A method for masking errors of video data by decoding compressed video data, wherein a data frame includes a plurality of macro blocks formed of a plurality of blocks, each having a direct current value, said method comprising the steps of:

calculating a difference value in DC values between respective blocks in said decoded video data;

determining whether the difference value is greater than a predetermined reference threshold;

copying data of the previous frame in the position in which the error of the present frame is generated by generating an error signal when the difference value is greater than said predetermined reference threshold; and writing the decoded data in the present frame when the difference value between the DC values is less than said predetermined reference threshold.

12. The method of claim 11, wherein said difference calculating step, difference determination step and copying step are performed at a reception side of a system for communicating compressed video data.

* * * * *